(12) United States Patent
Gilboa et al.

(10) Patent No.: US 10,012,831 B2
(45) Date of Patent: Jul. 3, 2018

(54) OPTICAL MONITORING OF SCAN PARAMETERS

(71) Applicant: APPLE INC., Cupertino, CA (US)

(72) Inventors: Niv Gilboa, Raanana (IL); Zeev Roth, Kadima (IL); Rafael Halfon, Hod-Hasharon (IL); Oz Barak, Tel Aviv (IL)

(73) Assignee: APPLE INC., Cupertino, CA (US)

( * ) Notice: Subject to any disclaimer, the term of this patent is extended or adjusted under 35 U.S.C. 154(b) by 236 days.

(21) Appl. No.: 14/816,107

(22) Filed: Aug. 3, 2015

(65) Prior Publication Data

US 2017/0038581 A1    Feb. 9, 2017

(51) Int. Cl.
| | |
|---|---|
| G02B 26/08 | (2006.01) |
| G02B 26/10 | (2006.01) |
| G02B 26/12 | (2006.01) |
| G02B 27/00 | (2006.01) |
| G01S 17/00 | (2006.01) |

(52) U.S. Cl.
CPC ............ *G02B 26/127* (2013.01); *G01S 17/00* (2013.01); *G02B 26/101* (2013.01); *G02B 27/0031* (2013.01)

(58) Field of Classification Search
CPC .. G02B 26/123; G02B 26/127; G02B 26/101; G02B 26/10; G02B 26/105; G02B 26/0833; G02B 26/0841; G02B 27/0031
USPC ................. 359/204.1, 204.2, 204.4
See application file for complete search history.

(56) References Cited

U.S. PATENT DOCUMENTS

| | | | |
|---|---|---|---|
| 3,796,498 | A | 3/1974 | Post |
| 4,850,673 | A | 7/1989 | Velzel et al. |
| 5,406,543 | A | 4/1995 | Kobayashi et al. |
| 5,477,383 | A | 12/1995 | Jain |
| 5,606,181 | A | 2/1997 | Sakuma et al. |
| 5,648,951 | A | 7/1997 | Kato |
| 5,691,989 | A | 11/1997 | Rakuljic et al. |
| 5,742,262 | A | 4/1998 | Tabata et al. |
| 5,781,332 | A | 7/1998 | Ogata |
| 6,002,520 | A | 12/1999 | Hoch et al. |
| 6,031,611 | A | 2/2000 | Rosakis et al. |
| 6,229,598 | B1 | 5/2001 | Yoshida |

(Continued)

FOREIGN PATENT DOCUMENTS

| | | |
|---|---|---|
| CN | 1213244 A | 4/1999 |
| CN | 1651971 A | 8/2005 |

(Continued)

OTHER PUBLICATIONS

Fienup, J.R., "Phase Retrieval Algorithms: A Comparison", Applied Optics, vol. 21, No. 15, pp. 2758-2769, Aug. 1, 1982.

(Continued)

*Primary Examiner* — Collin X. Beatty
(74) *Attorney, Agent, or Firm* — D. Kligler IP Services Ltd.

(57) ABSTRACT

Scanning apparatus includes a transmitter, which is configured to emit a beam comprising pulses of light, and a scanner, which is configured to scan the beam along a scan axis over a specified angular range. A scattering line extends across a path of the scanned beam. A receiver is configured to receive the light scattered from the scattering line and to generate an output indicative of an intensity of the scattered light. A controller is coupled to process the output of the receiver so as to monitor operation of the scanner.

15 Claims, 3 Drawing Sheets

(56) References Cited

U.S. PATENT DOCUMENTS

| | | | |
|---|---|---|---|
| 6,288,775 B1 | 9/2001 | Tanaka | |
| 6,560,019 B2 | 5/2003 | Nakai | |
| 6,583,873 B1 | 6/2003 | Goncharov et al. | |
| 6,611,000 B2 | 8/2003 | Tamura et al. | |
| 6,707,027 B2 | 3/2004 | Liess et al. | |
| 6,927,852 B2 | 8/2005 | Reel | |
| 6,940,583 B2 | 9/2005 | Butt et al. | |
| 7,112,774 B2 | 9/2006 | Baer | |
| 7,227,618 B1 | 6/2007 | Bi | |
| 7,304,735 B2 | 12/2007 | Wang et al. | |
| 7,335,898 B2 | 2/2008 | Donders et al. | |
| 7,700,904 B2 | 4/2010 | Toyota et al. | |
| 7,952,781 B2 | 5/2011 | Weiss et al. | |
| 8,384,997 B2 | 2/2013 | Shpunt et al. | |
| 8,807,766 B2* | 8/2014 | Hung | H04N 9/3129 353/122 |
| 9,201,237 B2* | 12/2015 | Chayat | G02B 5/1814 |
| 2004/0012958 A1 | 1/2004 | Hashimoto et al. | |
| 2004/0082112 A1 | 4/2004 | Stephens | |
| 2005/0030305 A1* | 2/2005 | Brown | G02B 26/0841 345/207 |
| 2005/0178950 A1 | 8/2005 | Yoshida | |
| 2006/0001055 A1 | 1/2006 | Ueno et al. | |
| 2006/0072100 A1 | 4/2006 | Yabe | |
| 2006/0215149 A1 | 9/2006 | LaBelle et al. | |
| 2006/0252167 A1 | 11/2006 | Wang | |
| 2006/0252169 A1 | 11/2006 | Ashida | |
| 2006/0269896 A1 | 11/2006 | Liu et al. | |
| 2007/0019909 A1 | 1/2007 | Yamauchi et al. | |
| 2008/0198355 A1 | 8/2008 | Domenicali et al. | |
| 2008/0212835 A1 | 9/2008 | Tavor | |
| 2008/0240502 A1 | 10/2008 | Freedman et al. | |
| 2008/0278572 A1 | 11/2008 | Gharib et al. | |
| 2009/0090937 A1 | 4/2009 | Park | |
| 2009/0096783 A1 | 4/2009 | Shpunt et al. | |
| 2009/0183125 A1 | 7/2009 | Magal et al. | |
| 2009/0185274 A1 | 7/2009 | Shpunt | |
| 2009/0237622 A1* | 9/2009 | Nishioka | H04N 9/3155 353/85 |
| 2010/0007717 A1 | 1/2010 | Spektor et al. | |
| 2010/0013860 A1 | 1/2010 | Mandella et al. | |
| 2010/0142014 A1 | 6/2010 | Rosen et al. | |
| 2011/0019258 A1 | 1/2011 | Levola | |
| 2011/0069389 A1 | 3/2011 | Shpunt | |
| 2011/0075259 A1 | 3/2011 | Shpunt | |
| 2011/0114857 A1 | 5/2011 | Akerman et al. | |
| 2011/0141480 A1 | 6/2011 | Meissner | |
| 2011/0187878 A1 | 8/2011 | Mor et al. | |
| 2011/0188054 A1 | 8/2011 | Petronius et al. | |
| 2011/0228251 A1 | 9/2011 | Yee et al. | |
| 2011/0295331 A1 | 12/2011 | Wells et al. | |
| 2012/0038986 A1 | 2/2012 | Pesach | |
| 2012/0140094 A1 | 6/2012 | Shpunt et al. | |
| 2012/0140109 A1 | 6/2012 | Shpunt et al. | |
| 2013/0038881 A1 | 2/2013 | Pesach et al. | |
| 2013/0038941 A1 | 2/2013 | Pesach et al. | |
| 2013/0207970 A1 | 8/2013 | Shpunt et al. | |
| 2014/0225824 A1 | 8/2014 | Shpunt et al. | |
| 2014/0291491 A1 | 10/2014 | Shpunt et al. | |
| 2015/0109586 A1* | 4/2015 | Masuda | H04N 9/3129 353/31 |

FOREIGN PATENT DOCUMENTS

| | | |
|---|---|---|
| CN | 1725042 A | 1/2006 |
| CN | 1748120 A | 3/2006 |
| CN | 201378231 Y | 1/2010 |
| CN | 101874221 A | 10/2010 |
| CN | 102200431 A | 9/2011 |
| DE | 102009046911 A1 | 5/2011 |
| JP | 201118178 A | 6/2011 |
| WO | 2007/043036 A1 | 4/2007 |
| WO | 2007/105205 A2 | 9/2007 |
| WO | 2008/120217 A2 | 10/2008 |
| WO | 2010/004542 A1 | 1/2010 |
| WO | 2012020380 A1 | 2/2012 |
| WO | 2012066501 A1 | 5/2012 |

OTHER PUBLICATIONS

International Application PCT/IL2008/01592 Search Report dated Apr. 3, 2009.
Sazbon et al., "Qualitative Real-Time Range Extraction for Preplanned Scene Partitioning Using Laser Beam Coding," Pattern Recognition Letters 26 , pp. 1772-1781, year 2005.
Gerchberg et al., "A Practical Algorithm for the Determination of the Phase from Image and Diffraction Plane Pictures," Journal Optik, vol. 35, No. 2, pp. 237-246, year 1972.
Moharam et al. "Rigorous coupled-wave analysis of planar-grating diffraction", Journal of the Optical Society of America, vol. 71, No. 6, pp. 818-818, Jul. 1981.
Eisen et al., "Total internal reflection diffraction grating in conical mounting" ,Optical Communications 261, pp. 13-18, year 2006.
O'Shea et al., "Diffractive Optics: Design, Fabrication and Test", SPIE Tutorial Texts in Optical Engineering, vol. TT62, pp. 66-72, SPIE Press, USA 2004.
Ezconn Czech A.S. "Site Presentation", 32 pages, Oct. 2009.
Luxtera Inc., "Luxtera Announces World's First 10GBit CMOS Photonics Platform", 2 pages, Carlsbad, USA, Mar. 28, 2005 (press release).
Bradley et al., "Synchronization and Rolling Shutter Compensation for Consumer Video Camera Arrays", IEEE International Workshop on Projector-Camera Systems—PROCAMS 2009, 8 pages, Miami Beach, Florida, 2009.
Marcia et al., "Fast Disambiguation of Superimposed Images for Increased Field of View", IEEE International Conference on Image Processing, 4 pages, San Diego, USA, Oct. 12-15, 2008.
Btendo, "Two Uni-axial Scanning Mirrors Vs One Bi-axial Scanning Mirror", 4 pages, Kfar Saba, Israel, Aug. 13, 2008.
Microvision Inc., "Micro-Electro-Mechanical System (MEMS) Scanning Mirror", 1 page, years 1996-2009.
European Patent Application # 11150668.9 Partial European Search Report dated Apr. 1, 2011.
Garcia et al., "Three-dimensional mapping and range measurement by means of projected speckle patterns", Applied Optics, vol. 47, No. 16, pp. 3032-3040, Jun. 1, 2008.
Garcia et al.., "Projection of Speckle Patterns for 3D Sensing", Journal of Physics, Conference series 139, 7 pages, year 2008.
International Application PCT/IB2011/053560 Search Report dated Jan 19, 2012.
International Application PCT/IB2011/055155 Search Report dated Apr. 20, 2012.
International Application PCT/IB2013/051986 Search Report dated Jul. 30, 2013.
International Application # PCT/IB2014/062244 Search Report dated Oct. 30, 2014.
Awtar et al, "Two-axis Optical MEMS Scanner," Proceedings of the ASPE Annual Meeting ,Paper No. 1800, 4 pages, year 2005.
CN Application # 201380015507.8 Office Action dated Apr. 29, 2016.

* cited by examiner

OPTICAL MONITORING OF SCAN PARAMETERS

FIELD OF THE INVENTION

The present invention relates generally to optical scanning, and particularly to methods and devices for monitoring timing and other parameters of a scanned optical beam.

BACKGROUND

Optical scanners are used in a wide range of applications. Some scanners use a rotating mirror to scan a beam.

For example, PCT International Publication WO 2012/020380, whose disclosure is incorporated herein by reference, describes apparatus for mapping, which includes an illumination module. This module includes a radiation source, which is configured to emit a beam of radiation, and a scanner, which is configured to receive and scan the beam over a selected angular range. Illumination optics are configured to project the scanned beam so as to create a pattern of spots extending over a region of interest. An imaging module is configured to capture an image of the pattern that is projected onto an object in the region of interest. A processor is configured to process the image in order to construct a three-dimensional (3D) map of the object.

In one of the embodiments described in this PCT publication, an illumination module comprises one or more beam sensors, such as photodiodes, which are coupled to a processor. These sensors are positioned at a selected angle or angles within the angular range that is scanned by a mirror so as to receive the scanned beam periodically and thus verify that the scanner is operating.

U.S. Patent Application Publication 2013/0207970, whose disclosure is incorporated herein by reference, describes depth engines that generate 3D mapping data by measuring the time of flight (TOF) of a scanning beam. A light transmitter, such as a laser, directs short pulses of light toward a scanning mirror, which scans the light beam over a scene of interest. The scanner may comprise a micromirror produced using microelectromechanical system (MEMS) technology. A receiver, such as a sensitive, high-speed photodiode (for example, an avalanche photodiode) receives light returned from the scene via the same scanning mirror. Processing circuitry measures the time delay between the transmitted and received light pulses at each point in the scan. This delay is indicative of the distance traveled by the light beam, and hence of the depth of the object at the point. The processing circuitry uses the depth data thus extracted in producing a 3D map of the scene.

U.S. Patent Application Publication 2013/0250387, whose disclosure is incorporated herein by reference, describes scanning apparatus that includes a transmitter, which is configured to emit a beam comprising pulses of light, and a scanning mirror, which is configured to scan the beam over a scene. A receiver is configured to receive the light reflected from the scene and to generate an output indicative of the pulses returned from the scene. A grating is formed on an optical surface in the apparatus and is configured to diffract a portion of the beam at a predetermined angle, so as to cause the diffracted portion to be returned from the scanning mirror to the receiver. A controller is coupled to process the output of the receiver so as to detect the diffracted portion and to monitor a scan of the mirror responsively thereto.

SUMMARY

Embodiments of the present invention that are described hereinbelow provide apparatus and techniques for monitoring the operation of an optical scanner.

There is therefore provided, in accordance with an embodiment of the invention, scanning apparatus, including a transmitter, which is configured to emit a beam including pulses of light, and a scanner, which is configured to scan the beam along a scan axis over a specified angular range. A scattering line extends across a path of the scanned beam. A receiver is configured to receive the light scattered from the scattering line and to generate an output indicative of an intensity of the scattered light. A controller is coupled to process the output of the receiver so as to monitor operation of the scanner.

In one embodiment, the scattering line includes a filament mounted so as to extend across the path of the scanned beam. In another embodiment, the apparatus includes a transparent optical element positioned in the path of the scanned beam, wherein the scattering line is scribed across the transparent optical element.

In some embodiments, the receiver is further configured to receive the light reflected from a scene beyond the scattering line within the specified angular range, wherein the output is further indicative of the pulses returned from the scene. In a disclosed embodiment, the controller is configured to process the output of the receiver so as to generate a three-dimensional map of the scene based on the returned pulses.

Typically, the controller is configured to calculate one or more operating parameters of the scanner responsively to the output of the receiver. In some embodiments, the scanner is configured to scan the beam in mutually-opposing first and second scan directions in alternation along the scan axis, and the controller is configured to calculate a scan offset between the first and second scan directions based on the output of the receiver.

Additionally or alternatively, the scanner is configured to scan the beam in a periodic scan pattern, and the one or more operating parameters calculated by the controller include at least one of a frequency, a phase, and an amplitude of the periodic scan pattern.

In one embodiment, the scattering line is one of at least first and second scattering lines, which extend at different, respective locations across the path of the scanned beam, and the output of the receiver includes first and second outputs that are indicative of the intensity of the light scattered from the first and second scattering lines, respectively. The controller is configured to calculate the one or more operating parameters responsively to a relation between the first and second outputs.

There is also provided, in accordance with an embodiment of the invention, a method for scanning, which includes scanning a beam including pulses of light along a scan axis over a specified angular range. A scattering line is positioned across a path of the scanned beam. The light scattered from the scattering line is received, and an output indicative of an intensity of the scattered light is generated and processed so as to monitor the scanning.

The present invention will be more fully understood from the following detailed description of the embodiments thereof, taken together with the drawings in which:

DETAILED DESCRIPTION OF EMBODIMENTS

Figure 1:
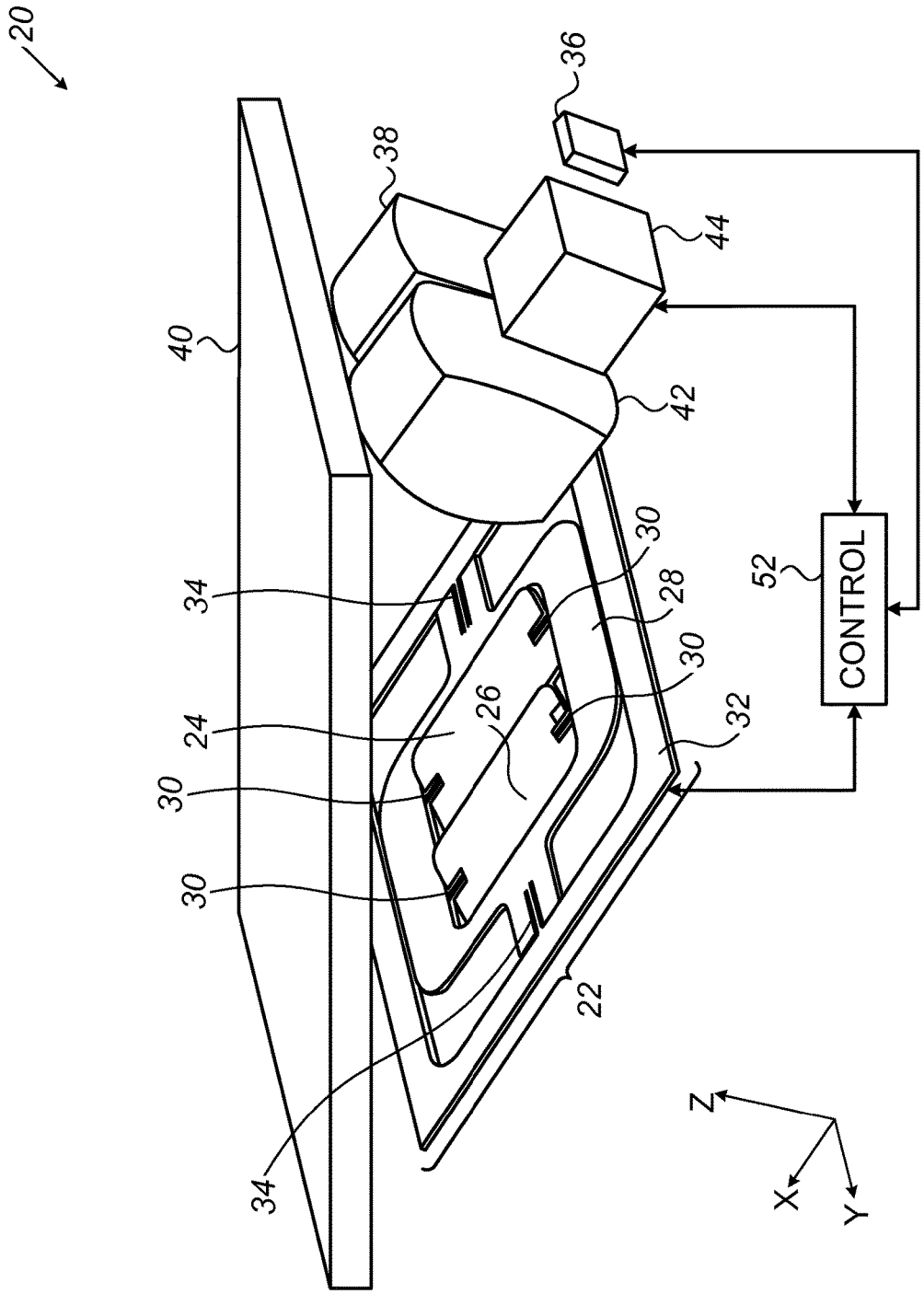
FIG. 1 is a schematic, pictorial illustration of an optical scanning device, in accordance with an embodiment of the present invention.

Accurate TOF-based depth mapping requires that the position of the scanning spot be precisely known at each point at which a depth measurement is made along the scan path. MEMS-based scanning mirrors in particular, although compact and low in cost, do not always provide the desired level of accuracy. Parameters such as the scan frequency, phase, amplitude, and zero-offset may vary substantially relative to desired baseline values. As a specific example, when the mirror is driven in a bi-directional raster scan (in which odd-numbered lines are scanned in one direction and even-numbered lines in the opposite direction), offset between the odd and even lines along the scan direction may vary. Unless corrected—either by closed-loop control of the scanner or by digital adjustment of the measured TOF values—inaccuracies of the scan parameters can degrade the quality of the depth map.

Embodiments of the present invention that are described herein provide techniques for monitoring scanner operation that are simple, effective and inexpensive to implement. The term "monitoring" is used in the present description and in the claims in the broad sense of measuring scanning parameters, such as scan angle as a function of time, as well as detecting deviation of the scanning parameters from certain ideal or baseline values.

In the disclosed embodiments, a transmitter emits a beam comprising pulses of light, and a scanner, such as a rotating mirror, scans the beam along a scan axis over a specified angular range. In some embodiments, as described further hereinbelow, this scan axis is one of two (or more) axes along which the beam is scanned. For purposes of monitoring the scan, a scattering line is extended across the path of the scanned beam. The scattering line may comprise, for example, a filament, such as a wire, mounted so as to extend across the path of the scanned beam, or a line that is scribed across a transparent optical element that is positioned in the path of the scanned beam.

A receiver receives the light scattered from the scattering line and generates an output that is indicative of the scattered light intensity as a function of the scan angle, i.e., the angle of deflection of the scanner (as determined, for example, by the angle of rotation of the rotating mirror). A controller processes this output in order to monitor operation of the scanner. The receiver may be dedicated to the purpose of such monitoring. Alternatively, it can be advantageous to use this same receiver to receive the light from the scanned beam that is reflected from a scene beyond the scattering line, such that the receiver output is further indicative of the pulses returned from the scene. In this latter case, the controller may process the output of the receiver, for example, so as to generate a 3D map of the scene based on the returned pulses.

In some embodiments of the present invention, the controller calculates one or more operating parameters of the scanner using the output of the receiver. For example, when the scanner scans the beam in mutually-opposing scan directions in alternation along the scan axis, as described above, and there is a scan offset between the two directions, the controller can estimate and compensate for this offset based on the difference in the output of the receiver between the directions. Additionally or alternatively, the controller can process the receiver output in order to extract the frequency, phase, and/or amplitude of a periodic scan pattern. It can be useful, particularly for this latter sort of calculation, to extend two (or more) parallel scattering lines at different, respective locations across the path of the scanned beam. In this case, the receiver will provide multiple outputs, in the form of two (or more) scattering peaks that are indicative of the intensity of the light scattered from the different scattering lines, and the controller uses the relation between these outputs in calculating the operating parameters of the scanner.

Although the embodiments that are shown in the figures and described in detail herein relate to a particular scanner design for use in 3D mapping, the principles of the present invention are equally applicable, mutatis mutandis, to other sorts of optical beam scanners, both for 3D mapping and for other applications. Such scanners may use not only MEMS mirrors to scan the transmitted beam, but also scanning mechanisms of other sorts, including, but not limited to, mechanically-rotating mirrors and acousto-optical and electro-optical deflectors.

The receiver that senses the scattered optical pulses may have a detection area that is scanned, using either the same scanning mechanism as the transmitted beam or its own scanning mechanism, as in the embodiments shown in the figures. Alternatively, the receiver may comprise an image sensor or other detector with a fixed field of view. The approach adopted in the pictured embodiments, in which the same receiver is used for both depth mapping and scan monitoring, is advantageous, inter alia, in that it can make use of existing components to perform the scan monitoring functions, and requires essentially no additional hardware components. In alternative embodiments, however, a dedicated receiver may be used for scan monitoring.

All of the above alternative implementations are considered to be within the scope of the present invention.

Figure 2:
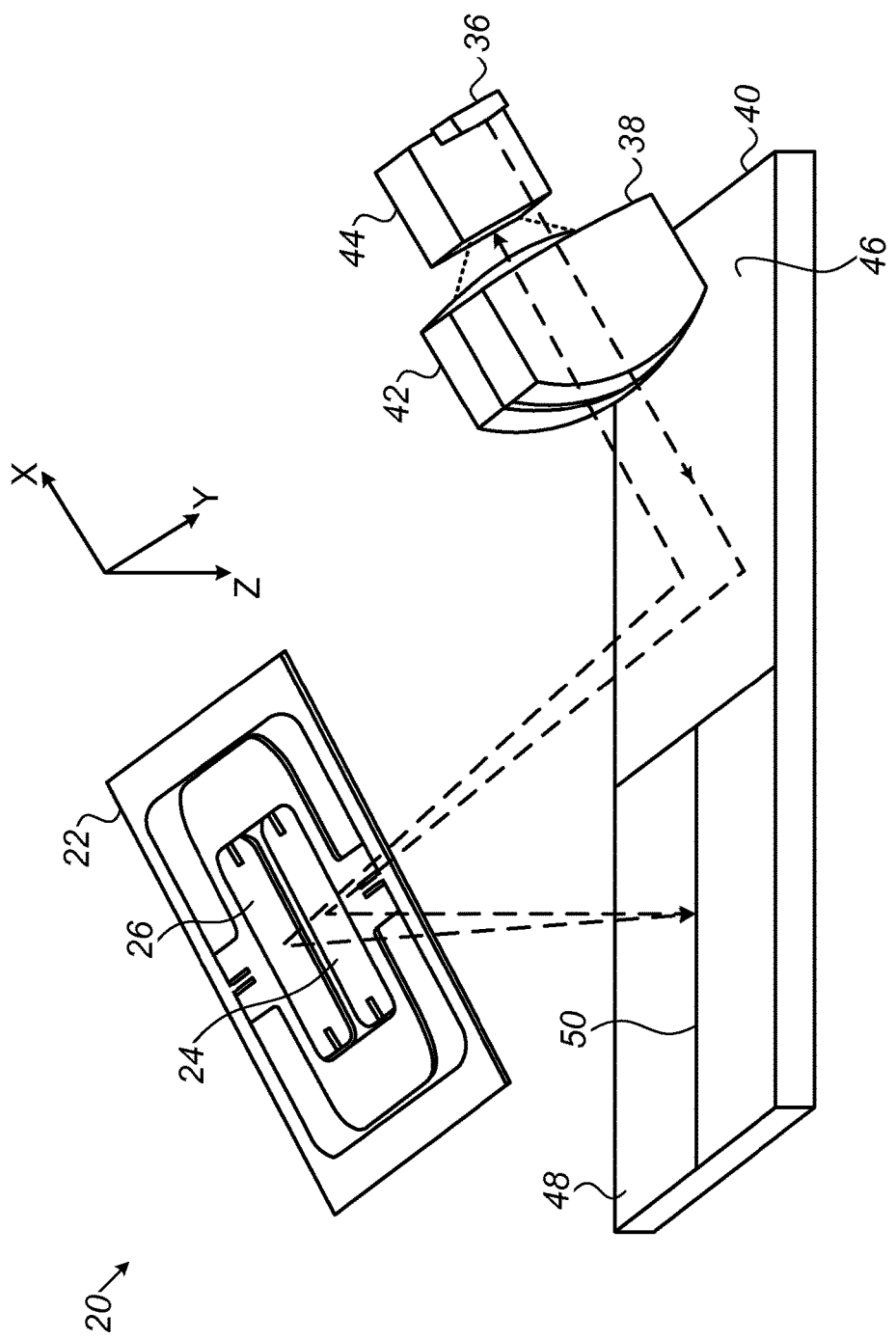
FIG. 2 is a schematic, pictorial illustration of the optical scanning device of FIG. 1, showing a scattering line used in monitoring operation of the device in accordance with an embodiment of the present invention.

Reference is now made to FIGS. 1 and 2, which schematically illustrate an optical scanning device 20, in accordance with an embodiment of the present invention. FIG. 1 presents a pictorial overview of device 20, while FIG. 2 is an alternative pictorial view showing optical beam paths and other features of the device. Device 20 can be particularly useful as a part of a 3D mapping system or other depth-sensing (LIDAR) device, in conjunction with a suitable scan driver and mechanical packaging, as are known in the art. (These components are omitted from the figures, however, for the sake of simplicity.) Alternatively, device 20 may be adapted for use as a scanning optical transceiver in other applications, such as free-space optical communications over a wide-angle optical link.

Scanning device 20 is built around a scanner 22, comprising an adjacent transmit mirror 24 and receive mirror 26, which are mounted together within a gimbal 28. Alternatively, two or more receive mirrors may be mounted side-by-side in gimbal 28, parallel to transmit mirror 24, or the same mirror may be used for both the transmitted and received beams (as in the above-mentioned U.S. Patent Application Publication 2013/0207970). Scanner 22 may be made from a substrate, such as a semiconductor wafer, which is etched to define base 32, gimbal 28, and transmit and receive mirrors 24, 26 in a MEMS process. (A reflective coating is deposited on the mirrors as a part of the process.) Alternatively, other mirror configurations may be used, as will be apparent to those skilled in the art.

Mirrors 24 and 26 rotate about respective hinges 30 relative to gimbal 28, while gimbal 28 rotates about hinges 34 relative to a base 32. Hinges 30 (and hence the axes of rotation of mirrors 24 and 26) are parallel to one another, along the X-axis in the figures, so that the rotation of mirror 24 will scan a reflected beam along a scan axis that is parallel to the Y-axis. Hinges 34 are oriented so that the axis of rotation of gimbal 28, shown as being oriented along the Y-axis, is perpendicular to the mirror axes. Gimbal 28 and mirrors 24 and 26 may be driven to rotate about their respective axes by any suitable sort of drive, such as the magnetic drives described in the references cited above in the Background section, or other types of magnetic and electrical scanner drives that are known in the art.

The dimensions and masses of transmit and receive mirrors 24 and 26 and hinges 30 may desirably be chosen so that the mirrors rotate about their respective hinges 30 by oscillation at or near a resonant frequency. On the other hand, gimbal 28 may be driven to rotate relative to base 32 in a non-resonant mode, typically at a frequency substantially lower than the resonant frequency of mirrors 24 and 26. The fast rotation of mirrors 24 and 26 about the X-axis and the slower rotation of gimbal 28 about the Y-axis may be coordinated so as to define a raster scan of the transmitted and received beams over an area of interest. Alternatively, the rotations of mirrors 24, 26 and gimbal 28 may be controlled to generate scan patterns of other sorts.

A transmitter 36 emits pulses of light, which are collimated by a collimating lens 38 and directed by a reflecting area 46 of an output plate 40 toward transmit mirror 24. The transmit mirror scans the beam toward a scene via a transmitting area 48 of plate 40, which is transparent to the light emitted by the transmitter. (The term "light," in the context of the present description and in the claims, refers to optical radiation of any wavelength, including visible, infrared, and ultraviolet radiation.) Light reflected back from the scene and through transmitting area 48 is directed by receive mirror 26 toward reflective area 46, and from area 46 to a collection lens 42, which focuses the reflected light onto a receiver 44. In alternative optical layouts (not shown in the figures), light reflected back from the scene may be directed by receive mirror 26 toward a collection lens, without reflection from reflective area 46. Additionally or alternatively, reflective area 46 may be eliminated from the transmit path, as well.

Receiver 44 typically comprises a high-speed optoelectronic detector, which generates an output indicative of the time of flight of the pulses to and from points in the scene. In one embodiment, transmitter comprises a pulsed laser diode, while receiver 44 comprises an avalanche photodiode, but any other suitable sorts of emitting and sensing components may alternatively be used in device 20. Scanner 22 scans the transmitted and received beams of light together over a predefined angular range, so that at each point in the scan, receiver 44 receives light from the same area of the scene that is illuminated at that point by transmitter 36.

For purposes of monitoring the scan parameters, a scattering line in the form of a filament 50 is mounted on or adjacent to the surface of transmitting area 48, and thus extends across the path of the scanned, transmitted beam. Filament 50 is oriented perpendicular to the "fast" scan axis of the beam reflected from mirror 24, i.e., perpendicular to the Y direction. In one embodiment, filament 50 comprises a titanium wire, having a diameter of about 100 µm and a matte surface finish, to reduce specular reflections. The diameter of the transmitted beam that is incident on area 48 is typically about 1.5 mm, and several successive pulses from transmitter 36 typically strike filament 50 at different angles in each scan line. Alternatively, filament 50 may comprise other sorts of metal wires or non-metallic materials, of larger or smaller diameters. Further alternatively, the scattering line may be scribed (for example, by etching or cutting) across transmitting area 48.

Figure 3:
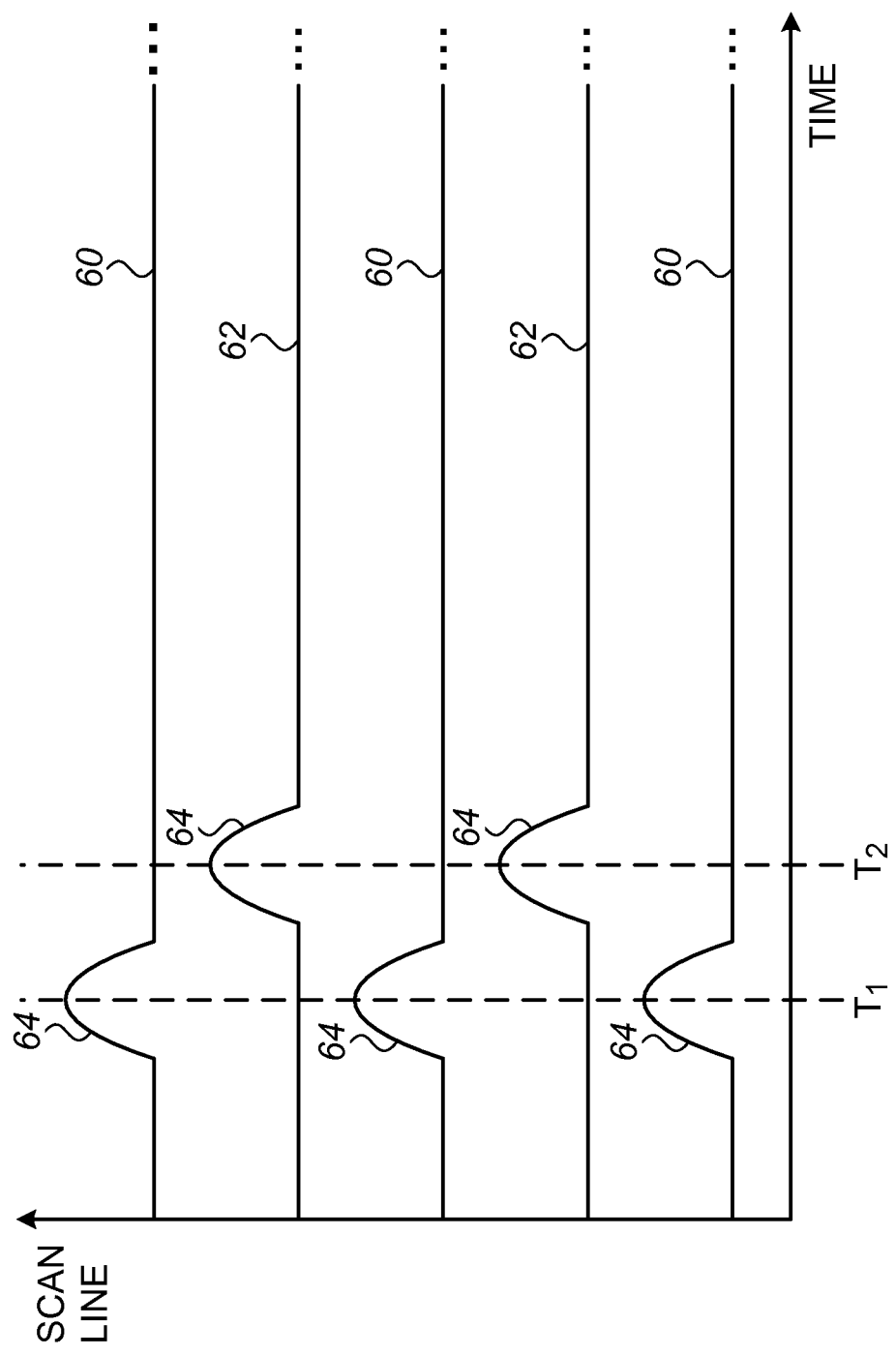
FIG. 3 is a schematic plot of signals received in the device of FIGS. 1 and 2, in accordance with an embodiment of the present invention.

Receiver 44 receives the light that is scattered from filament 50 and generates an output that is indicative of the scattered light intensity. An example of such an output is shown in FIG. 3 and is described hereinbelow with reference to this figure. A controller 52 processes this output in order to monitor the operation of scanner 22. In the pictured embodiment, controller 52 also processes other components of the output of receiver 44 so as to generate a 3D map of the scene based on the TOF of the pulses that are reflected from the scene. (When the same receiver is used for both scattering and TOF measurements, time windowing can be used, for example, to separate the receiver output due to scatter from filament 50, which is received immediately after emission of the corresponding pulse by transmitter 36, and the output due to reflection from the scene, which is typically delayed by at least several nanoseconds.)

Controller 52 calculates one or more operating parameters, such as the scan angle, of scanner 22 based on the receiver output due to scattering from filament 50. The calculated scan angle can be combined with the readout of receiver 44 in computing a 3D map with enhanced angular accuracy. More generally, controller 52 can apply this calculated scan angle, as well as other scan parameters, either in controlling the elements of scanning device 20 to operate with greater precision or in correcting the data extracted from the scanning device to compensate for scan inaccuracies. For example, controller 52 may compute and apply appropriate shifts to the coordinates of the TOF data in order to improve the accuracy of the 3D map generated by device 20.

FIG. 3 is a schematic plot of signals output by receiver 44 in response to scattering from filament 50, in accordance with an embodiment of the present invention. In this embodiment, mirror 24 is assumed to scan the beam back and forth rapidly in a periodic (typically sinusoidal) pattern along a scan axis that is parallel to the Y-axis shown in FIGS. 1 and 2. Gimbal 28 concurrently scans at a lower frequency in order to generate a raster scan pattern, but only the Y-axis scan is reflected in FIG. 3.

The signals shown in FIG. 3 alternate between odd scan lines 60, in which mirror 24 scans the transmitted beam in one direction (for example, the +Y direction), and even scan lines 62, in which the beam in scanned in the opposite (−Y) direction. In each scan line, receiver 44 outputs a scattering curve 64, having a well-defined shape, in terms of intensity over time, that is determined by the geometrical properties of the transmitted beam and of filament 50. Because of scan timing inaccuracies, however, curves 64 in odd scan lines 60 are offset in time relative to curves 64 in even scan lines 62: In scan lines 60, the peaks of the curves occur at a time $T_1$ relative to a specified zero location, whereas in scan lines 62, the peaks appear to occur at a different time $T_2$. If the scans in the two directions were properly synchronized, there would be no difference between $T_1$ and $T_2$.

The scan offset between the two directions is indicative of a timing skew between the scan directions, which will result in an erroneous coordinate offset in the depth map between the odd and even scan lines. In addition, due to geometrical and mechanical factors, operating parameters of scanner 22 may vary over time, and when a two-axis scanner is used, as illustrated in FIGS. 1 and 2, the scan offset and amplitude along the fast scan direction (the Y direction in the present example) can change as a function of the scan coordinate in the slow (X) direction.

To address these problems, controller 52 processes curves 64 in order to calculate accurate scan parameters continually during operation of scanner 22. For this purpose, for example, controller 52 may fit the measured occurrence times of curves 64 to a parametric model of the scan angle $\alpha(t)$ as a function of time having the general form: $\alpha(t)=A \sin(\omega(t-t_0)+\varphi)+b$. The controller thus derives the scan parameters A, $\omega$, $t_0$, $\varphi$ and b, and is able to calculate $\alpha(t)$ accurately at any time t during the scan. In this manner, controller 52 is able to associate a precise scan angle value with each depth value derived from the receiver output and can correct the 3D map output, for example by buffering and interpolating the depth values to compensate for angular distortion and errors.

The fitting process can be improved if the location and angular orientation of filament 50 are known, typically by means of pre-calibration, and can be refined still further if a pair of scattering lines is extended across the beam path. Even without such calibration, however, a single scattering line still enables controller 52 to extract useful scan coordinates from curves 64. Referring back to FIG. 3, for example, controller 52 is able, on this basis, to correct $\alpha(t)$ for the difference between $T_1$ and $T_2$ and thus to apply a corresponding correction to the coordinate values of the TOF measurements made by device 20 for purposes of 3D mapping. Alternatively or additionally, the controller may modify the drive signals that are applied to scanner 22 in order to reduce or eliminate the offset between the alternating scan lines, as well as reducing other scan inaccuracies.

Additionally or alternatively, controller 52 may calculate and correct other operating parameters of scanner 22 based on the timing of scattering curves 64. For example, the time span between successive scattering curves is indicative of the period, and hence the frequency, of oscillation of mirror 24. Furthermore, controller 52 can compute the difference between the measured time $T_1$ and/or $T_2$ and a pre-calibrated baseline time $T_0$, at which curves 64 are expected to occur, as an indication of the phase offset of the scan.

In an alternative embodiment, not shown in the figures, two or more filaments or scattering lines of other sorts are extended across transmitting area 48. In this case, the signals output by receiver 44 will contain a double output curve, with multiple scattering peaks due to the multiple scattering lines. Controller 52 can then compute the relation between the two peaks, including their respective times of occurrence and the difference between these times, as an indication of the frequency, phase, and/or amplitude of the scan, and use the results of this computation in calculating and correcting scan parameters.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Scanning apparatus, comprising:
  a transmitter, which is configured to emit a beam comprising pulses of light;
  a scanner, which is configured to scan the beam along a scan axis over a specified angular range;
  a scattering line, which extends across a path of the scanned beam;
  a receiver, which is configured to receive the light scattered from the scattering line and to receive the light reflected from a scene beyond the scattering line within the specified angular range, and to generate a monitoring output, within a first time window, indicative of an intensity of the scattered light, and a scene output, within a second time window subsequent to the first time window, indicative of the pulses returned from the scene; and
  a controller, which is coupled to process the monitoring output of the receiver so as to monitor operation of the scanner and to process the scene output of the receiver so as to generate a three-dimensional map of the scene.

2. The apparatus according to claim 1, wherein the scattering line comprises a filament mounted so as to extend across the path of the scanned beam.

3. The apparatus according to claim 1, and comprising a transparent optical element positioned in the path of the scanned beam, wherein the scattering line is scribed across the transparent optical element.

4. The apparatus according to claim 1, wherein the controller is configured to calculate one or more operating parameters of the scanner responsively to the monitoring output of the receiver.

5. The apparatus according to claim 4, wherein the scanner is configured to scan the beam in mutually-opposing first and second scan directions in alternation along the scan axis, and wherein the controller is configured to calculate a scan offset between the first and second scan directions based on the monitoring output of the receiver.

6. The apparatus according to claim 4, wherein the scanner is configured to scan the beam in a periodic scan pattern, and wherein the one or more operating parameters calculated by the controller comprise at least one of a frequency, a phase, and an amplitude of the periodic scan pattern.

7. The apparatus according to claim 4, wherein the scattering line is one of at least first and second scattering lines, which extend at different, respective locations across the path of the scanned beam, and wherein the monitoring output of the receiver comprises first and second outputs that are indicative of the intensity of the light scattered from the first and second scattering lines, respectively, and wherein the controller is configured to calculate the one or more operating parameters responsively to a relation between the first and second outputs.

8. A method for scanning, comprising:
  scanning a beam comprising pulses of light along a scan axis over a specified angular range;
  positioning a scattering line across a path of the scanned beam;
  receiving the light scattered from the scattering line and generating a monitoring output, within a first time window, indicative of an intensity of the scattered light;
  receiving the light reflected from a scene beyond the scattering line within the specified angular range, and generating a scene output, within a second time window subsequent to the first time window, indicative of the pulses returned from the scene;
  processing the monitoring output so as to monitor the scanning; and
  processing the scene output so as to generate a three-dimensional map of the scene.

9. The method according to claim 8, wherein the scattering line comprises a filament mounted so as to extend across the path of the scanned beam.

10. The method according to claim 8, wherein positioning the scattering line comprises positioning a transparent optical element in the path of the scanned beam, wherein the scattering line is scribed across the transparent optical element.

11. The method according to claim 8, wherein receiving the light comprises using a single receiver to sense both the light scattered from the scattering line and the light reflected from the scene.

12. The method according to claim 8, wherein processing the output comprises calculating one or more operating parameters of the scanning responsively to the monitoring output.

13. The method according to claim 12, wherein scanning the beam comprises scanning the beam in mutually-opposing first and second scan directions in alternation along the scan axis, and wherein calculating the one or more operating parameters comprises calculating a scan offset between the first and second scan directions based on the output.

14. The method according to claim 12, wherein scanning the beam comprises generating a periodic scan pattern, and wherein calculating the one or more operating parameters comprises calculating at least one of a frequency, a phase, and an amplitude of the periodic scan pattern.

15. The method according to claim 12, wherein positioning the scattering line comprises extending at least first and second scattering lines in parallel at different, respective locations across the path of the scanned beam in the orientation perpendicular to the scan axis, and wherein generating the monitoring output comprises generating first and second outputs that are indicative of the intensity of the light scattered from the first and second scattering lines, respectively, and wherein calculating the one or more operating parameters comprises computing the one or more operating parameters responsively to a relation between the first and second outputs.

* * * * *